United States Patent
Sun et al.

(10) Patent No.: US 10,033,930 B2
(45) Date of Patent: Jul. 24, 2018

(54) METHOD OF REDUCING A VIDEO FILE SIZE FOR SURVEILLANCE

(71) Applicant: MULTIMEDIA IMAGE SOLUTION LIMITED, Dublin (IE)

(72) Inventors: Yanlong Sun, Hangzhou (CN); Jun Jin, Hangzhou (CN); Shuai-Bin Chen, Hangzhou (CN)

(73) Assignee: Hangzhou Closeli Technology Co., Ltd., Hangzhou, Zhejiang (CN)

(*) Notice: Subject to any disclaimer, the term of this patent is extended or adjusted under 35 U.S.C. 154(b) by 361 days.

(21) Appl. No.: 14/623,482

(22) Filed: Feb. 16, 2015

(65) Prior Publication Data

US 2016/0241817 A1    Aug. 18, 2016

(51) Int. Cl.
| | |
|---|---|
| H04N 19/132 | (2014.01) |
| H04N 19/137 | (2014.01) |
| H04N 19/172 | (2014.01) |
| H04N 7/18 | (2006.01) |
| H04N 5/232 | (2006.01) |

(52) U.S. Cl.
CPC ....... *H04N 5/23293* (2013.01); *H04N 19/132* (2014.11); *H04N 19/137* (2014.11); *H04N 19/172* (2014.11)

(58) Field of Classification Search
CPC .......... H04N 19/53; H04N 19/70; H04N 7/18; H04N 7/183; H04N 5/772
See application file for complete search history.

(56) References Cited

U.S. PATENT DOCUMENTS

| | | | | |
|---|---|---|---|---|
| 5,067,015 A | * | 11/1991 | Combridge | ............ H04N 19/53 375/240.11 |
| 2013/0336590 A1 | * | 12/2013 | Sentinelli | ............... H04N 5/772 382/218 |
| 2015/0304665 A1 | * | 10/2015 | Hannuksela | ........... H04N 19/70 375/240.02 |

* cited by examiner

*Primary Examiner* — Sathyanaraya V Perungavoor
*Assistant Examiner* — Patricia I Young
(74) *Attorney, Agent, or Firm* — Winston Hsu

(57) ABSTRACT

To generate a compressed video having a reduced video file size, an original video having a plurality of images are captured. Each of the plurality of images are compared. If images of the plurality of images are determined to be redundant images, the images are deleted. The original video having the redundant images removed is saved to form the compressed video.

14 Claims, 6 Drawing Sheets

METHOD OF REDUCING A VIDEO FILE SIZE FOR SURVEILLANCE

BACKGROUND OF THE INVENTION

1. Field of the Invention

The present invention relates to a method of reducing a video file size for surveillance, and more particularly, a method of reducing a video file size for surveillance by reducing a number of images of the video file.

2. Description of the Prior Art

There are a growing number of people who are installing surveillance systems in homes and offices for personal or professional purposes. A user can use a mobile device to receive and view the surveillance video captured by the surveillance system anywhere. The surveillance video is transmitted to the mobile device through a network connecting to a cloud storage where the surveillance video is stored. Because the use of the cloud storage incurs a fee, receiving and storing of the surveillance video can generate a big cost. Due to the limitation of the cloud storage, a method of further reducing a compressed video file size for surveillance is needed.

SUMMARY OF THE INVENTION

An embodiment of the present invention presents a method of reducing a video file size. The method comprises capturing an original video having a plurality of images, comparing each of the plurality of images, deleting images of the plurality of images determined to be redundant images, and saving the original video having the redundant images removed to form a compressed video.

An embodiment of the present invention presents a method of playing a compresses video. The method comprises receiving the compressed video to a mobile device through a network, decompressing the compressed video file to include redundant images deleted from an original video to form a decompressed video, and playing the decompressed video on the mobile device.

An embodiment of the present invention presents a method of transmitting a compresses video. The method comprises receiving an image of a plurality of images of a pre-compressed video, comparing a motion value of the image and a predetermined value, when the motion value is greater than the predetermined value, transmitting the image, and when the motion value is less than the predetermined value, transmitting a static image tag.

An embodiment of the present invention presents a method for receiving a compressed video. The method comprises receiving the compressed video, the compressed video having a plurality of images and a static image tag, when an image of the plurality of images is detected, displaying the image, and when the static image tag is detected, displaying a last image displayed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
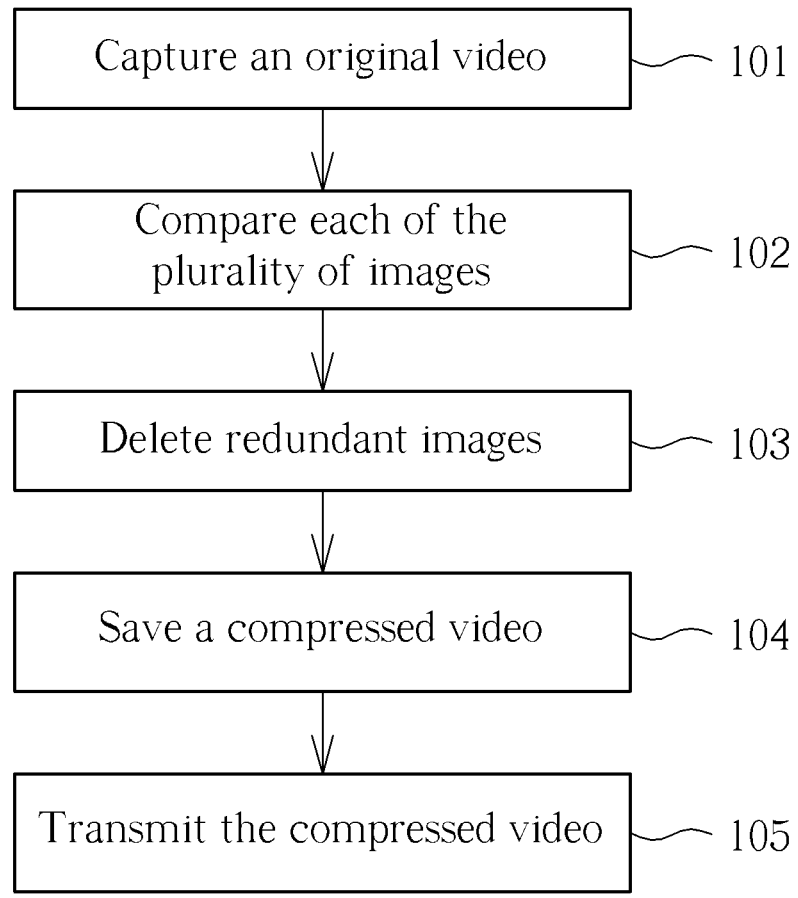
FIG. 1 illustrates a flowchart of a method of reducing a video file size according to an embodiment of the present invention.

FIG. 1 illustrates a flowchart of a method of reducing a video file size according to an embodiment of the present invention. The steps of the method of reducing the video file size may include but is not limited to the following steps:

Step 101: receive an original video having a plurality of images;

Step 102: compare each of the plurality of images;

Step 103: delete images of the plurality of images determined to be redundant images;

Step 104: save the original video having the redundant images removed to form a compressed video; and Step 105: transmit the compressed video to a mobile device through a network.

In step 101, the original video having the plurality of images may be received. The original video may be captured using an image capturing device such a video recorder or a webcam. The image capturing device may be fixed to capture a single view of a location. Furthermore, the image capturing device may be fixed but is allowed to rotate to a certain angle to capture a wider view of the location. The original video may be captured in any video format. Furthermore, a memory may be attached to the image capturing device to record the original image to protect the integrity of the original image. In some embodiments of the present invention, the original video may be a video file that is already been compressed to reduce the size of the video file and form a pre-compressed video such as a H264 video or a MPEG4 video.

In step 102, each of the plurality of images may be compared. During comparison, a current image captured may be compared to a preceding image. The process may continue until the capturing of the original video is stopped or a memory used to store the original video has run out of space.

In step 103, the images of the plurality of images determined to be redundant images may be deleted from the original video. The redundant images may be images wherein motion is not detected. For example, if the frame rate for capturing is one image per 100 millisecond and the images captured within 1 second are determined to be the same, the images captured within the 1 second time frame are determined to be without motion and are determined to be redundant images except for the first image of the images captured within 1 second. If images following the images from the 1 second time frame are also determined to be the same as the images in the 1 second time frame, the following images may also be determined to be without motion and are determined to be redundant images. The time of the original video when a first image of the redundant images is captured may be recorded as a timestamp. The number of the redundant images may be recorded as a number indicator. The images of the plurality of images determined to be redundant images may then be deleted from the original video. An image may be determined to be a redundant image if the image is the same image as a first image. The redundant images may be a sequence of consecutive images determined to be the same with the first image during comparison. Note that the first image is not considered as a redundant image and is therefore not deleted in this step. Furthermore, the redundant images may be a sequence of images the same as a prior sequence of images. When the image capturing device is allowed to rotate, capturing different view of the location in different images, a sequence of images may be captured to monitor the location one time. Thus, if the sequence of images is repeated, the time when the sequence of images start may be the time recorded in the timestamp, the number indicator may be the number of times the sequence of images is repeated or the total number of images removed from the compressed file. Note that the first set of the sequence of images may not be considered redundant images and is therefore not deleted in this step In step 104, the original video having the redundant images removed may be saved to form a compressed video. The compressed video may be saved as the same video format as the original video format or a different video format. The compressed video may include the timestamp to indicate where the redundant images are removed. The compressed video may also include the number indicator to indicate a number of the redundant images removed from the original image.

In step 105, the compressed video may be transmitted to a mobile device through a network. The mobile device may be a tablet, a laptop, or a mobile phone. The mobile device may have a program installed capable of reading all the information included in the compressed video and capable of decompressing the compressed video.

In another embodiment of the present invention, the image capturing device may compress the plurality of images of the video upon capturing the video. Each of the plurality of images may have a motion vector. The value of the motion vector may indicate an offset between consecutive images. Thus, the motion vector may be used to determine motion in the plurality of images. When an image is determined to have no motion, the image may be discarded and replaced with a static image tag.

In a further embodiment of the present invention, the image capturing device may compress the plurality of images of the video upon capturing the video. Each of the plurality of images may have a corresponding motion value. The motion value may indicate a size of the motion between images of the plurality of images. Thus, the motion value may be compared to a predetermined value to determine motion in the plurality of images. When an image is determined to have no motion, the image may be discarded and replaced with a static image tag.

Figure 2:
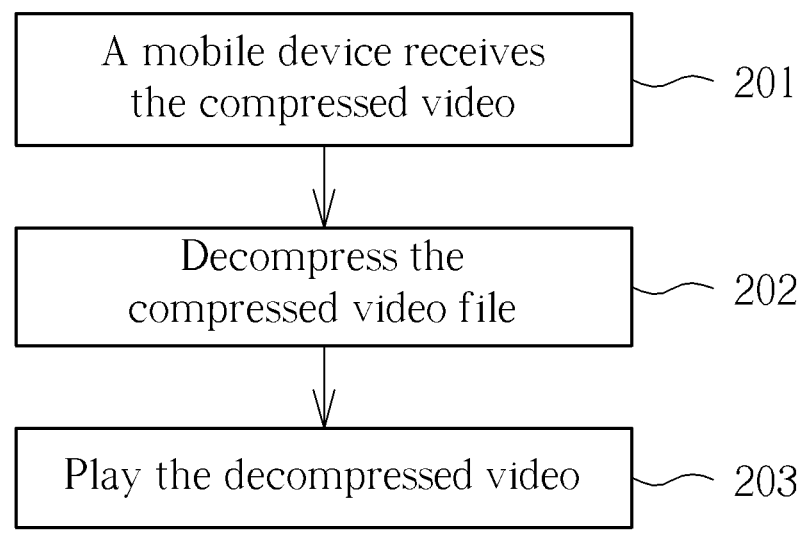
FIG. 2 illustrates a flowchart of a method of playing a compressed video according to an embodiment of the present invention.

FIG. 2 illustrates a flowchart of a method of playing a compressed video according to an embodiment of the present invention. The steps of the method of playing the compresses video may include but is not limited to the following steps:

Step 201: a mobile device receives the compressed video through a network;

Step 202: decompress the compressed video file to include redundant images deleted from an original video to form a decompressed video; and Step 203: play the decompressed video on the mobile device.

In step 201, the mobile device may receive the compressed video through a network. In step 202, the compressed video file is decompressed to include redundant images deleted from an original video to form a decompressed video. When decompressing the compressed video, the part of the compressed video where the redundant images are to be inserted may be determined according to the timestamp. And, the number of the redundant images to be inserted into the compressed video may be determined according to the number indicator. The decompressed video may be formed by having the redundant images inserted into the compressed video where the timestamp has indicated. The image corresponding to the timestamp may be used to generate the number indicator quantity of the redundant images needed for insertion. The compressed video may be decompressed using a user interface. Furthermore, more added security, the compressed file may be in another file format than the original video. The different file format may be uniquely compatible to the user interface. Such that, the decompressing and playing of the compressed video may only be done using the user interface.

In step 203, the decompressed video is played on the mobile device. The decompressed video may be played using the user interface capable of inserting the redundant images into the compressed video without adding to the memory in the mobile device used.

Figure 3:
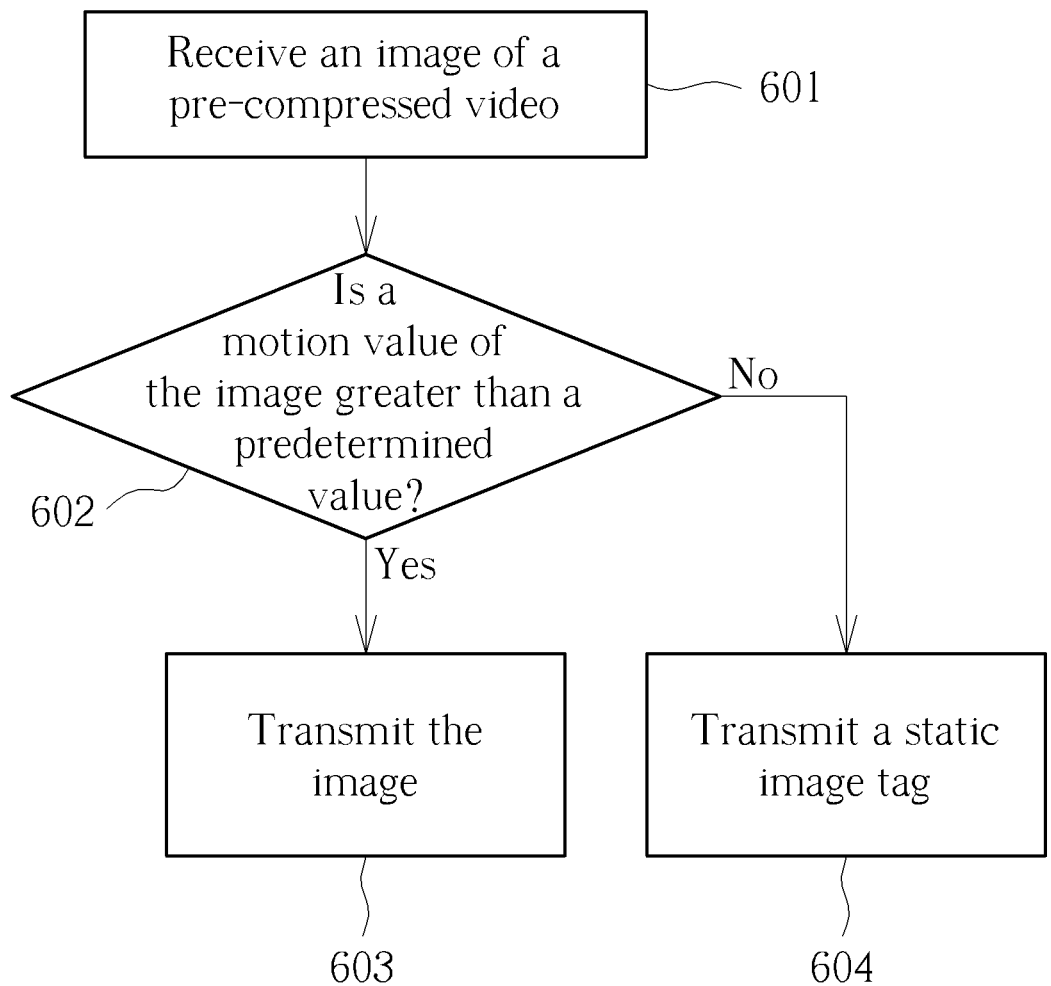
FIG. 3 illustrates a flowchart of a method of transmitting a compressed video according to an embodiment of the present invention.

FIG. 3 illustrates a flowchart of a method of transmitting a compressed video according to an embodiment of the present invention. The steps of the method of transmitting the compressed video may include but is not limited to the following steps:

Step 601: receive an image of a plurality of images of a pre-compressed video;

Step 602: compare a motion value of the image and a predetermined value; when the motion value is greater than the predetermined value, go to step 603; when the motion value is less than the predetermined value, go to step 604;

Step 603: transmit the image; and

Step 604: transmit a static image tag.

In step 601, an image of the plurality of images of the pre-compressed video may be received from an image capturing device such as a webcam. The pre-compressed video may be in any pre-existing compressed video format such as MPEG-4 video or H264 video. Each of the plurality of images may have a motion value. The motion value may correspond to the motion detected corresponding to each of the plurality of images. In step 602, a motion value of the image may be compared to a predetermined value. The predetermined value may be constant or changing according to the plurality of images. When the motion value is greater than the predetermined value, the image is transmitted to a mobile device (step 603). When the motion value is less than the predetermined value, the image may be discarded by the mobile device and a static image tag may be transmitted to the mobile device (step 604). The static image tag may be a predetermined image tag having a size less than a size of the image.

Figure 4:
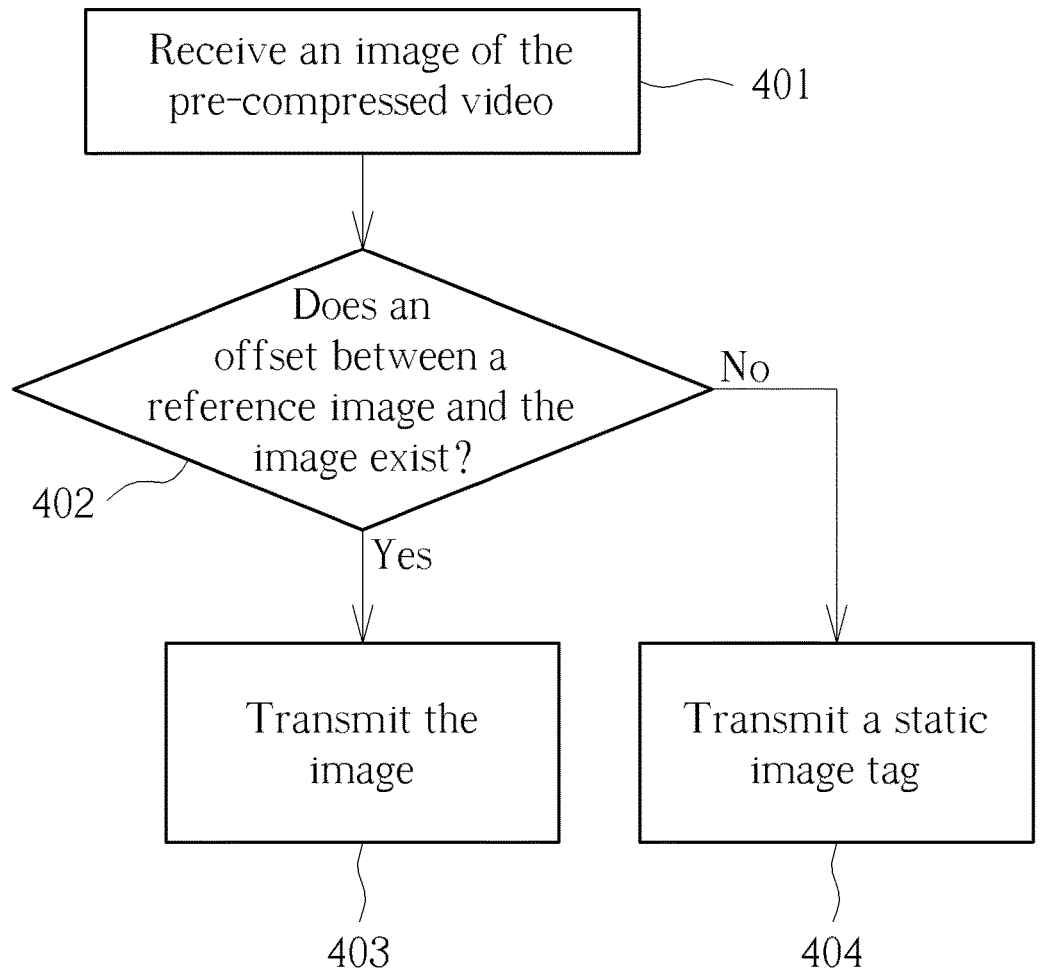
FIG. 4 illustrates a flowchart of a method of transmitting a compressed video according to another embodiment of the present invention.

FIG. 4 illustrates a flowchart of a method of transmitting a compressed video according to another embodiment of the present invention. The steps of the method of transmitting the compressed video may include but is not limited to the following steps:

Step 401: receive an image of a plurality of images of a pre-compressed video;

Step 402: determine an offset between a reference image and the image according to a motion vector; when the offset is detected, go to step 403; when the offset is not detected, go to step 404;

Step 403: transmit the image; and

Step 404: transmit a static image tag.

In step 401, the image of the plurality of images of the pre-compressed video may be received from an image capturing device such as a webcam. The pre-compressed video may be any pre-existing compressed video format such as MPEG-4 video or H264 video. Each of the plurality of images may have a motion vector. The motion vector may be a two-dimensional vector used for inter prediction providing an offset from the coordinates in the image being processed to the coordinates in a reference image. In step 402, an offset between a reference image and the image may be determined according to a motion vector. The reference image may be the last image wherein a motion has been detected or the first image of the pre-compressed video during the start of the transmission. When an offset is detected, the image is transmitted to a mobile device (step 403). When the offset is not detected, the image may be discarded by the mobile device and a static image tag may be transmitted to the mobile device (step 404). The static image tag may be a predetermined image tag having a size less than a size of the image.

Figure 5:
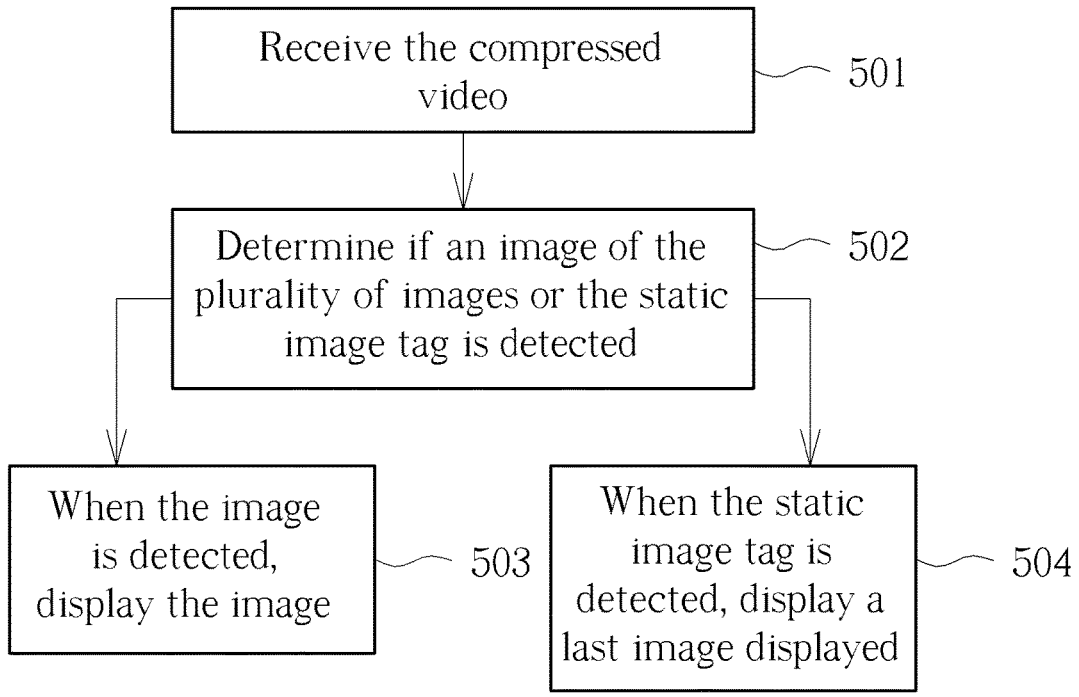
FIG. 5 illustrates a flowchart of a method of receiving a compressed video according to an embodiment of the present invention.

FIG. 5 illustrates a flowchart of a method of receiving a compressed video according to an embodiment of the present invention. The steps of the method of receiving the compressed video may include but is not limited to the following steps:

Step 501: receive a plurality of images and a static image tag of the compressed video;

Step 502: determine if an image of the plurality of images or the static image tag is detected; when the image is detected, go to step 503; when the static image tag is detected, go to step 504;

Step 503: display the image; and

Step 504: display a last image displayed.

In step 501, a mobile device may receive the compressed video. The compress video may include a plurality of images and a static image tag. In step 502, upon receiving the compressed video, the compressed video may be processed to identify the plurality of images and the static image tag. When an image of the plurality of images is detected, the mobile device may display the image (step 503). When the static image tag is detected, the mobile device may display the last image displayed before the static image tag is detected (step 504).

Figure 6:
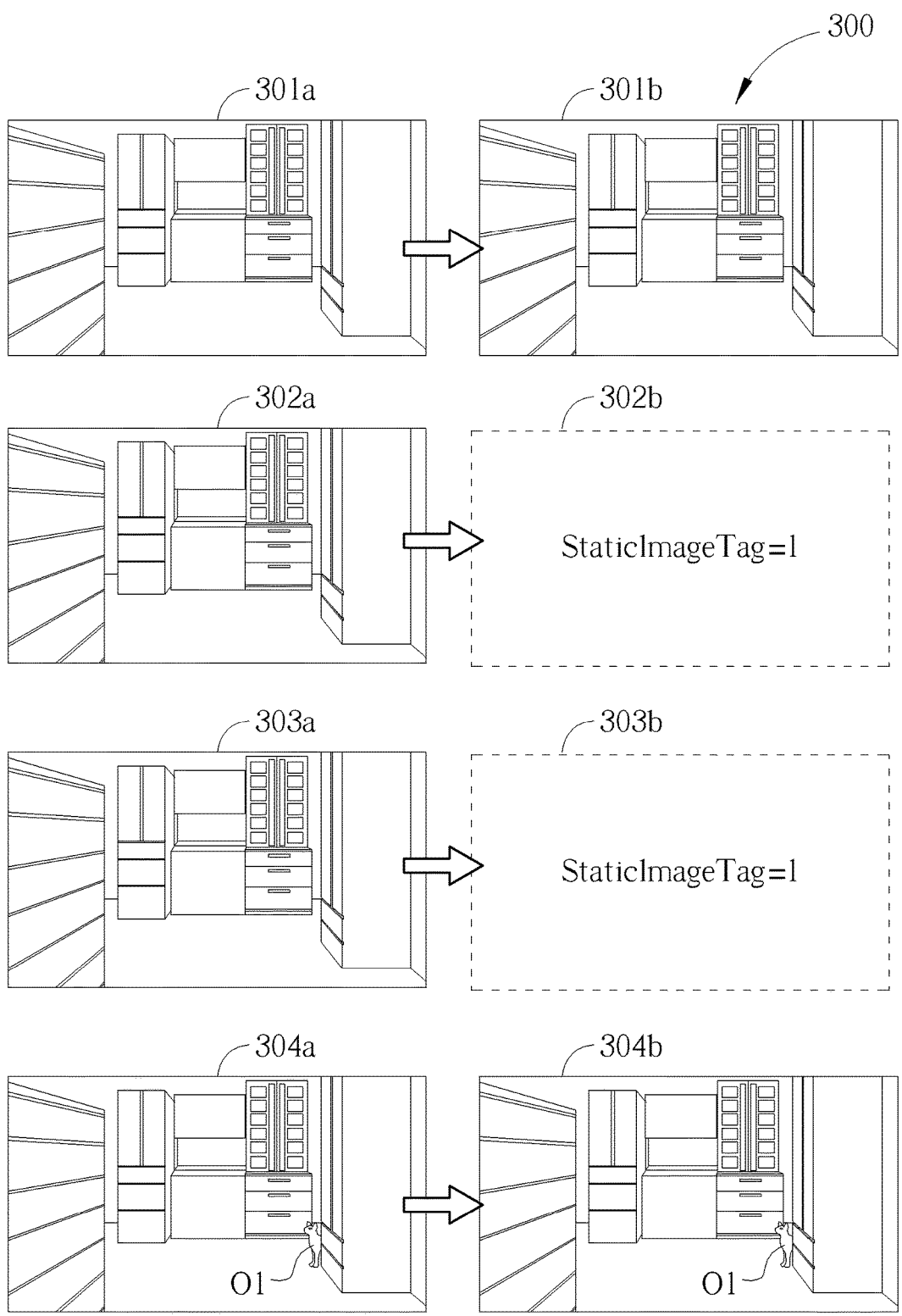
FIG. 6 illustrates an example of a plurality of images transmitted to a mobile device and a plurality of images received by the mobile device according to an embodiment of the present invention.

FIG. 6 illustrates an example of a plurality of images 301a to 304a transmitted to a mobile device and a plurality of images 301b and 304b received by the mobile device according to an embodiment of the present invention. A surveillance video may be captured using a webcam. The surveillance video may be first compressed to form a pre-compressed video such as a H264 video. After processing of each of the images to form the H264 video, the images may be transmitted to a cloud memory or a mobile device. The images of the H264 video may each have a motion vector used to determine motion between consecutive images. If the H264 video is a 720p format, a transmission speed of the images may be 512 kbps. Thus, a 512 kb size of image data may be transmitted every second.

For prior art, when the webcam captures a surveillance video of a static environment, the transmission speed may be reduced to, for example, 100 kbps since there is no change in the images. Although the image quality is lowered, the user does not notice the change in quality.

The embodiment of the present invention may perform further processing on a pre-compressed surveillance video file to further reduce the file size of the transmitted surveillance video. The surveillance video may already be a pre-compressed video such as H264. If a consecutive number of images such as the plurality of images 301a to 303a are taken, the first image 301a may be transmitted using a transmission speed of 512 kbps (size of image data may be 512 kb) and the following images 302a and 303a may be replaced with a marker such as a static image tag 302b and 303b since the 302a and 303a are determined to be the same as the image 301a. The static image tag 302b and 303b may have a size of 1 kb. Thus, greatly reducing the memory used to by the mobile device for receiving the plurality of images of the surveillance video. In another embodiment, when the mobile device encounters a static image tag 302b and 303b, the last received image 301b may be repeated to show a normal video being played. Since the last image is repeated, there would not be any change in the quality of the images. Thus the user does not notice the change in quality.

When a change in image is detected during comparison of a present image to the first static image (the present image being the image 304a may be compared to the first image being the image 301a), the present image may be transmitted to the mobile device having a normal file size (i.e. 512 kb) as shown in the image 304b in FIG. 3 since the image 304a is different from the image 301a (a cat O1 not captured in the image 301a is present in the image 304a).

The embodiment of the present invention presents a method of reducing a video file size by deleting redundant images from the original video to form a compressed video. The compressed video may include a time stamp for indicating where, in the compressed video, the redundant images have been deleted and a number indicator to indicate the number of redundant images deleted from the original video to form the compressed video. A compressed video may have a plurality of timestamps or a plurality number indicator depending on the number of times redundant images occur in the original video. In other embodiment of the present invention, the compressed video may have a plurality of static image tags transmitted in place of redundant images. The number of static image tags transmitted may depend on the number of times redundant images occur in the original video. In some embodiments, since the original video does not include any redundant image, the compressed video may not include a static image tag. The file size of the compressed file may be comparatively smaller than the original video that may be a pre-compressed video such as a H264 video or MPEG4 video before processing. Thus, the burden on the memory of the mobile device may be reduced when receiving and playing the compressed video since the memory required by the compressed video is greatly reduced. Also, since the transmitted data corresponding to the redundant images is greatly reduced as compared to prior art, the bandwidth needed for the transmission of the compressed video is also greatly reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of reducing a video file size, comprising:
   receiving an original video having a plurality of images;

determining a first set of sequential images of the plurality of images having different views of a location;

determining a subsequent second set of sequential images of the plurality of images having the different views of the location;

comparing the first and second sets of sequential images;

deleting the second set of sequential images as redundant images when the comparison indicates that the second set of sequential images is substantially similar to the first set of sequential images;

saving the original video having the redundant images removed to form a compressed video, wherein the compressed video includes a number indicator to indicate quantity of the redundant images removed from the original image; and recovering the redundant images deleted from the original video when playing the compressed video.

2. The method claim 1, further comprising:

transmitting the compressed video to a mobile device through a network.

3. The method claim 1, wherein the compressed video is a different file format than the original video.

4. The method claim 1, wherein the compressed video is a same file format as the original video.

5. The method claim 1, wherein the compressed video includes a timestamp to indicate where the redundant images are removed.

6. The method claim 1, wherein the redundant images are images indicating no motion detected within a timeframe of the redundant images.

7. The method claim 1, wherein the original video is a H264 video or a MPEG4 video.

8. A method of playing a compressed video, comprising:

a mobile device receiving the compressed video through a network, wherein the compressed video includes a number indicator to indicate quantity of the redundant images deleted from an original video, wherein the redundant images are a second set of sequential images having different views of a location subsequent to and substantially similar to a first set of sequential images having the different views of a location;

decompressing the compressed video file and recovering the redundant images deleted from the original video to include the redundant images to form a decompressed video; and playing the decompressed video on the mobile device.

9. The method claim 8, wherein the compressed video includes a timestamp to indicate where the redundant images are removed.

10. The method claim 9, wherein decompressing the compressed video file to include redundant images deleted from an original video to form a decompressed video comprises:

determining where to insert the redundant images in the compressed video according to the timestamp;

determining the number of the redundant images to be inserted into the compressed video according to the number indicator; and forming the decompressed video having the redundant images inserted into the compressed video where the timestamp has indicated.

11. The method claim 8, wherein the compressed video is a different file format than the original video.

12. A method for transmitting a compressed video, comprising:

receiving a plurality of images of a pre-compressed video;

determining a first set of sequential images of the plurality of images having different views of a location;

determining a subsequent second set of sequential images of the plurality of images having the different views of the location;

transmitting a static image tag and deleting the second set of sequential images as redundant images when the comparison indicates that the second set of sequential images is substantially similar to the first set of sequential images, wherein the static image tag includes a number indicator to indicate quantity of the redundant images removed from the original pre-compressed video;

comparing a motion value of the images and a predetermined value when the images second set of sequential images is not substantially similar to the first set of sequential images;

when the motion value is greater than the predetermined value, transmitting the second set of sequential images;

when the motion value is less than the predetermined value, transmitting a static image tag; and recovering the redundant images deleted from the original pre-compressed video when playing the compressed video.

13. The method in claim 12, wherein the pre-compressed video is a H264 video or a MPEG4 video.

14. A method for receiving a compressed video, comprising:

receiving the compressed video, the compressed video having a plurality of images and a static image tag, wherein the static image tag includes a number indicator to indicate quantity of redundant images removed from an original video and the redundant images are a second set of sequential images from the original video having different views of a location subsequent to and substantially similar to a first set of sequential images from the original video having the different views of a location;

when an image of the plurality of images is detected, displaying the image; and when the static image tag is detected, recovering the redundant images removed from the original video to include the redundant images when playing the compressed video.

* * * * *